US010877985B2

(12) United States Patent
Pominville et al.

(10) Patent No.: US 10,877,985 B2
(45) Date of Patent: *Dec. 29, 2020

(54) SYSTEMS AND METHODS FOR MAKING VISUAL DATA REPRESENTATIONS ACTIONABLE

(71) Applicant: salesforce.com, inc., San Francisco, CA (US)

(72) Inventors: Patrice Pominville, San Francisco, CA (US); Didier Prophete, San Francisco, CA (US); Dylan Thom, San Francisco, CA (US)

(73) Assignee: salesforce.com, inc., San Francisco, CA (US)

(*) Notice: Subject to any disclaimer, the term of this patent is extended or adjusted under 35 U.S.C. 154(b) by 203 days.

This patent is subject to a terminal disclaimer.

(21) Appl. No.: 16/112,069

(22) Filed: Aug. 24, 2018

(65) Prior Publication Data

US 2018/0365304 A1 Dec. 20, 2018

Related U.S. Application Data

(63) Continuation of application No. 14/876,427, filed on Oct. 6, 2015, now Pat. No. 10,089,368.

(Continued)

(51) Int. Cl.
*G06F 7/00* (2006.01)
*G06F 16/248* (2019.01)
(Continued)

(52) U.S. Cl.
CPC ........ *G06F 16/248* (2019.01); *G06F 16/2228* (2019.01); *G06F 16/24575* (2019.01);
(Continued)

(58) Field of Classification Search
CPC .... G06F 16/254; G06F 16/26; G06F 16/2228; G06F 16/248; G06F 16/9535
(Continued)

(56) References Cited

U.S. PATENT DOCUMENTS 5,577,188 A 11/1996 Zhu
5,608,872 A 3/1997 Schwartz et al.
(Continued)

OTHER PUBLICATIONS

Pedersen et al., "Query Optimization for OLAP-XML Federations" ACM, Nov. 8, 2012 (pp. 57-64).
(Continued)

*Primary Examiner* — Md I Uddin
(74) *Attorney, Agent, or Firm* — Holland & Hart, LLP

(57) ABSTRACT

The disclosed technology includes systems and methods for making visual representations actionable. This technology makes it possible to drill into data, identify records and take action directly, enhancing customized data visualization representations. The technology disclosed relates to a platform for ultra-fast, ad-hoc data exploration and faceted navigation on integrated, heterogeneous data sets. The disclosed systems and methods for adding and customizing quick actions make it possible for developers, admins, and ISVs to provide customized actionable visual data representations with direct linking for accessing data in a company's records and for linking to third party sites, without saving a new state on a server when dashboard elements are updated. The disclosed systems and methods for making data visualizations actionable in an analytics environment also make it possible to target multiple platforms—generating lenses and dashboards that let users take advantage and access data in a company's records and link to other websites.

18 Claims, 11 Drawing Sheets

Related U.S. Application Data

(60) Provisional application No. 62/220,886, filed on Sep. 18, 2015.

(51) Int. Cl.
| | |
|---|---|
| *G06F 16/22* | (2019.01) |
| *G06F 16/9535* | (2019.01) |
| *G06F 16/2457* | (2019.01) |
| *G06F 16/9032* | (2019.01) |
| *G06F 16/25* | (2019.01) |
| *G06F 16/26* | (2019.01) |

(52) U.S. Cl.
CPC ............ *G06F 16/254* (2019.01); *G06F 16/26* (2019.01); *G06F 16/90328* (2019.01); *G06F 16/9535* (2019.01)

(58) Field of Classification Search
USPC ................................ 707/722, 736, 737, 723
See application file for complete search history.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fornukong et al. |
| 5,963,953 A | 10/1999 | Cram et al. |
| 5,999,192 A | 12/1999 | Selfridge et al. |
| 6,092,083 A | 7/2000 | Brodersen et al. |
| 6,105,051 A | 8/2000 | Borkenhagen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,212,544 B1 | 4/2001 | Borkenhagen et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Fedlcarnp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,480,876 B2 | 11/2002 | Rehg et al. |
| 6,535,909 B1 | 3/2003 | Rust |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,697,935 B1 | 2/2004 | Borkenhagen et al. |
| 6,711,565 B1 | 3/2004 | Subramaniam et al. |
| 6,721,713 B1 | 4/2004 | Guheen et al. |
| 6,724,399 B1 | 4/2004 | Katchour et al. |
| 6,728,702 B1 | 4/2004 | Subrarnaniarn et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,757,689 B2 | 6/2004 | Battas et al. |
| 6,763,351 B1 | 7/2004 | Subramaniarn et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniarn et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,995,768 B2 | 2/2006 | Jou et al. |
| 7,062,502 B1 | 6/2006 | Kesler |
| 7,069,231 B1 | 6/2006 | Cinarkaya et al. |
| 7,069,497 B1 | 6/2006 | Desai |
| 7,181,758 B1 | 2/2007 | Chan |
| 7,228,352 B1 | 6/2007 | Yaguchi et al. |
| 7,278,115 B1 | 10/2007 | Conway et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,356,840 B1 | 4/2008 | Bedell et al. |
| 7,380,213 B2 | 5/2008 | Pokorny et al. |
| 7,401,094 B1 | 7/2008 | Kesler |
| 7,412,455 B2 | 8/2008 | Dillon |
| 7,508,769 B1 | 3/2009 | Chan |
| 7,571,191 B2 | 8/2009 | Dill et al. |
| 7,590,641 B1 | 9/2009 | Oison |
| 7,603,483 B2 | 10/2009 | Psounis et al. |
| 7,620,655 B2 | 11/2009 | Larsson et al. |
| 7,698,160 B2 | 4/2010 | Beaver et al. |
| 7,711,750 B1 | 5/2010 | Dutta et al. |
| 7,756,335 B2 | 7/2010 | Sternby |
| 7,779,475 B2 | 8/2010 | Jakobson et al. |
| 7,818,728 B1 | 10/2010 | Olson |
| 7,836,178 B1 | 11/2010 | Bedell et al. |
| 7,840,518 B1 | 11/2010 | Rubin |
| 7,851,004 B2 | 12/2010 | Hirao et al. |
| 7,890,581 B2 | 2/2011 | Rao et al. |
| 7,996,255 B1 | 8/2011 | Shenoy et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,041,670 B2 | 10/2011 | Bakalash et al. |
| 8,045,800 B2 | 10/2011 | Tang et al. |
| 8,073,850 B1 | 12/2011 | Hubbard et al. |
| 8,082,301 B2 | 12/2011 | Ahigren et al. |
| 8,086,585 B1 | 12/2011 | Brashers et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,209,333 B2 | 6/2012 | Hubbard et al. |
| 8,271,992 B2 | 9/2012 | Chatley et al. |
| 8,275,836 B2 | 9/2012 | Beaver et al. |
| 8,285,709 B2 | 10/2012 | Candea et al. |
| 8,302,020 B2 | 10/2012 | Louch et al. |
| 8,321,865 B2 | 11/2012 | Amini et al. |
| 8,326,848 B2 | 12/2012 | Dettinger et al. |
| 8,375,041 B2 | 2/2013 | Webster et al. |
| 8,448,170 B2 | 5/2013 | Wipfel et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,521,758 B2 | 8/2013 | Nachnani et al. |
| 8,549,602 B2 | 10/2013 | Vaeth |
| 8,555,286 B2 | 10/2013 | Flores et al. |
| 8,566,301 B2 | 10/2013 | Rueben et al. |
| 8,646,103 B2 | 2/2014 | Jakobson et al. |
| 8,688,491 B1 | 4/2014 | Shenoy et al. |

(56) References Cited

U.S. PATENT DOCUMENTS

| | | |
|---|---|---|
| 8,756,275 B2 | 6/2014 | Jakobson |
| 8,769,004 B2 | 7/2014 | Jakobson |
| 8,769,017 B2 | 7/2014 | Jakobson |
| 8,775,941 B1 | 7/2014 | Deshpande et al. |
| 8,793,759 B2 | 7/2014 | Nishizawa et al. |
| 8,805,971 B1 | 8/2014 | Roth et al. |
| 8,826,390 B1 | 9/2014 | Varda |
| 8,839,087 B1 | 9/2014 | Hayden |
| 8,845,337 B1 | 9/2014 | Hu et al. |
| 8,905,763 B1 | 12/2014 | Hu et al. |
| 8,976,955 B2 | 3/2015 | Liberman Ben-Ami et al. |
| 9,058,194 B2 | 6/2015 | Murray |
| 9,128,995 B1 | 9/2015 | Fletcher et al. |
| 9,396,018 B2 | 7/2016 | Schneider et al. |
| 9,449,188 B2 | 9/2016 | Schneider et al. |
| 9,536,107 B2 | 1/2017 | Soman et al. |
| 9,600,548 B2 | 3/2017 | Schneider et al. |
| 9,646,150 B2 | 5/2017 | Toth |
| 9,767,145 B2 | 9/2017 | Prophete et al. |
| 10,049,141 B2 | 8/2018 | Prophete |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniarn et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0144868 A1 | 7/2003 | MacIntyre et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Mukundan et al. |
| 2003/0192029 A1 | 10/2003 | Hughes |
| 2003/0200436 A1 | 10/2003 | Eun et al. |
| 2003/0204427 A1 | 10/2003 | Mukundan et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0085316 A1 | 5/2004 | Malik et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199543 A1 | 10/2004 | Braud et al. |
| 2004/0236726 A1 | 11/2004 | Ewing et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0097060 A1 | 5/2005 | Lee et al. |
| 2005/0177570 A1 | 8/2005 | Dutta et al. |
| 2005/0182684 A1 | 8/2005 | Dawson et al. |
| 2005/0262073 A1 | 11/2005 | Reed et al. |
| 2006/0021019 A1 | 1/2006 | Hinton et al. |
| 2007/0211060 A1 | 9/2007 | Suyama et al. |
| 2007/0283287 A1 | 12/2007 | Taylor et al. |
| 2008/0059256 A1 | 3/2008 | Lynch |
| 2008/0088628 A1 | 4/2008 | Lu et al. |
| 2008/0104531 A1 | 5/2008 | Stambaugh |
| 2008/0109740 A1 | 5/2008 | Prinsen et al. |
| 2008/0163099 A1 | 7/2008 | Gu et al. |
| 2008/0165970 A1 | 7/2008 | Chung et al. |
| 2008/0192056 A1 | 8/2008 | Robertson et al. |
| 2008/0249972 A1 | 10/2008 | Dillon |
| 2009/0049013 A1 | 2/2009 | Kumbi et al. |
| 2009/0063415 A1 | 3/2009 | Chatfield et al. |
| 2009/0096812 A1 | 4/2009 | Boixel |
| 2009/0100342 A1 | 4/2009 | Jakobson |
| 2009/0106656 A1 | 4/2009 | Handy et al. |
| 2009/0177744 A1 | 7/2009 | Marlow et al. |
| 2009/0187586 A1 | 7/2009 | Olson |
| 2009/0189915 A1 | 7/2009 | Mercer et al. |
| 2010/0036893 A1 | 2/2010 | Serval et al. |
| 2010/0070968 A1 | 3/2010 | Paulsen et al. |
| 2010/0161643 A1 | 6/2010 | Gionis et al. |
| 2010/0169268 A1 | 7/2010 | John et al. |
| 2010/0177051 A1 | 7/2010 | Bilow |
| 2010/0235771 A1 | 9/2010 | Greg, III |
| 2011/0035374 A1 | 2/2011 | Vadrevu et al. |
| 2011/0078708 A1 | 3/2011 | Dokovski et al. |
| 2011/0106853 A1 | 5/2011 | Baker et al. |
| 2011/0119251 A1 | 5/2011 | Yu |
| 2011/0167256 A1 | 7/2011 | Lee et al. |
| 2011/0218958 A1 | 9/2011 | Warshavsky et al. |
| 2011/0247051 A1 | 10/2011 | Bulumulla et al. |
| 2011/0295841 A1 | 12/2011 | Sityon et al. |
| 2011/0314047 A1 | 12/2011 | Koronthaly et al. |
| 2012/0042218 A1 | 2/2012 | Cinarkaya et al. |
| 2012/0089902 A1 | 4/2012 | Sheflin |
| 2012/0144332 A1 | 6/2012 | Sola |
| 2012/0209586 A1 | 8/2012 | Mieritz et al. |
| 2012/0233137 A1 | 9/2012 | Jakobson et al. |
| 2012/0265647 A1 | 10/2012 | Negrillo et al. |
| 2012/0290407 A1 | 11/2012 | Hubbard et al. |
| 2012/0310931 A1 | 12/2012 | Oliver et al. |
| 2012/0331536 A1 | 12/2012 | Chabbewal et al. |
| 2013/0086870 A1 | 4/2013 | Pong |
| 2013/0103538 A1 | 4/2013 | Scholl et al. |
| 2013/0132091 A1 | 5/2013 | Skerpac |
| 2013/0141428 A1 | 6/2013 | Gipson |
| 2013/0144868 A1 | 6/2013 | Ickman et al. |
| 2013/0179769 A1 | 7/2013 | Gurfinkel et al. |
| 2013/0212497 A1 | 8/2013 | Zelenko et al. |
| 2013/0247216 A1 | 9/2013 | Cinarkaya et al. |
| 2013/0275904 A1 | 10/2013 | Bhaskaran et al. |
| 2013/0300743 A1 | 11/2013 | Degrell et al. |
| 2013/0311454 A1 | 11/2013 | Ezzat |
| 2014/0033019 A1 | 1/2014 | Zhang et al. |
| 2014/0052713 A1 | 2/2014 | Schauer et al. |
| 2014/0053091 A1 | 2/2014 | Hou et al. |
| 2014/0074771 A1 | 3/2014 | He et al. |
| 2014/0089318 A1 | 3/2014 | Liu et al. |
| 2014/0157106 A1 | 6/2014 | Bertram et al. |
| 2014/0172776 A1 | 6/2014 | Liu et al. |
| 2014/0247268 A1 | 9/2014 | Drucker et al. |
| 2014/0258970 A1 | 9/2014 | Brown et al. |
| 2014/0280690 A1 | 9/2014 | Yi et al. |
| 2014/0289408 A1 | 9/2014 | Ishino |
| 2014/0289611 A1 | 9/2014 | Norwood et al. |
| 2014/0304036 A1 | 10/2014 | Sjoblom |
| 2014/0310232 A1 | 10/2014 | Plattner et al. |
| 2014/0370484 A1 | 12/2014 | Hermosura |
| 2014/0372319 A1 | 12/2014 | Wolovitz |
| 2015/0032620 A1 | 1/2015 | Castinado et al. |
| 2015/0040041 A1 | 2/2015 | Yang et al. |
| 2015/0047003 A1 | 2/2015 | Khan |
| 2015/0058931 A1 | 2/2015 | Miu et al. |
| 2015/0088807 A1 | 3/2015 | Toppin et al. |
| 2015/0106208 A1 | 4/2015 | Lancar et al. |
| 2015/0120567 A1 | 4/2015 | Van Rooyen et al. |
| 2015/0161805 A1 | 5/2015 | Glazer et al. |
| 2015/0212663 A1* | 7/2015 | Papale .............. G06F 16/248 715/762 |
| 2015/0229638 A1 | 8/2015 | Loo |
| 2015/0317748 A1 | 11/2015 | Roberts et al. |
| 2015/0347542 A1* | 12/2015 | Sullivan ............ G06F 16/254 707/602 |

(56) References Cited

U.S. PATENT DOCUMENTS

| | | |
|---|---|---|
| 2016/0044040 A1 | 2/2016 | Caffary, Jr. |
| 2016/0062555 A1 | 3/2016 | Ward et al. |
| 2016/0103592 A1 | 4/2016 | Prophete et al. |
| 2016/0103702 A1 | 4/2016 | Schneider et al. |
| 2016/0103872 A1 | 4/2016 | Prophete et al. |
| 2016/0103914 A1 | 4/2016 | Im et al. |
| 2016/0104002 A1 | 4/2016 | Schneider et al. |
| 2016/0104003 A1 | 4/2016 | Schneider et al. |
| 2016/0104311 A1 | 4/2016 | Allyn |
| 2016/0210332 A1 | 7/2016 | Milton et al. |

OTHER PUBLICATIONS

Rao et al., "Spatial Hierarchy and OLAP-Favored Search in Spatial Data Warehouse", ACM, Nov. 7, 2003 (pp. 48-55).

Salesforce.com, "SOAP API Developer's Guide" <https://resources.docs.salesforce.com/200/latest/en-us/sfdc/pdf/aspen_api.pdf>, May 5, 2006 (2224 pages).

Salesforce.com, "Row-Level Security for Datasets", <https://help.salesforce.com/apex/HTViewHelpDoc?d=bi_security_datasets_row_level.htm> version prior to Oct. 10, 2013 (2 pages).

Salesforce.com, "Salesforce Security Guide" <http://resources.docs.salesforce.com/2007/17/en-us/sfdc/pdf/salesforce_security_impl_guide.pdf> version prior to Oct. 10, 2013.

Salesforce.com, "Salesforce Analytics Cloud Implementation and Data Integration Guide" <http://hhra.talendforge.org/secure/attachment/74327/Analytics%20Cloud%20Guide.pdf>, Sep. 23, 2014.

RLS Core Predicate Template, about Jun. 2014 (2 pages).

Salesforce, Inc., "Security Implementation Guide", version 28, Aug. 30, 2013 (111 pages).

Salesforce, Inc., "SOAP API Developer's Guide", version 28, Aug. 23, 2013 (1344 pages).

United States Patent and Trademark Office, "Office Action", issued in connection with U.S. Appl. No. 14/512,274, dated Jan. 13, 2017 (24 pages).

United States Patent and Trademark Office, "Office Action", issued in connection with U.S. Appl. No. 14/598,157, dated Jan. 30, 2017 (78 pages).

Shimada, et al., "Proposing a New Task Model Towards Many-Core Architecture", ACM, 2013 (pp. 45-48).

Pu, "Modeling, Querying and Reasoning about OLAP Databases: A Functional Approach", ACM, 2008 (pp. 1-8).

Papadakis et al., "A System to Measure, Control and Minimize End-to-End Head Tracking Tatency in Immersive Simulations", ACM, 2011 (pp. 581-584).

Wang et al., "Efficient Task Replication for Fast Response Time in Parallel Computation", ACM, 2014 (pp. 599-600).

United States Patent and Trademark Office, "Office Action", issued in connection with U.S. Appl. No. 14/512,263, dated Feb. 13, 2017 (29 pages).

United States Patent and Trademark Office, "Final Office Action", issued in connection with U.S. Appl. No. 14/512,274, dated Apr. 21, 2017 (39 pages).

United States Patent and Trademark Office, "Final Office Action", issued in connection with U.S. Appl. No. 14/598,157, dated May 26, 2017 (98 pages).

United States Patent and Trademark Office, "Non-Final Office Action", issued in connection with U.S. Appl. No. 15/229,024, dated Sep. 22, 2017 (34 pages).

United States Patent and Trademark Office, "Notice of Allowance", issued in connection with U.S. Appl. No. 15/229,024, dated Dec. 7, 2017 (9 pages).

United States Patent and Trademark Office, "Office Action", issued in connection with U.S. Appl. No. 14/512,263, dated Nov. 6, 2017 (41 pages).

United States Patent and Trademark Office, "Non-Final Office Action", issued in connection with U.S. Appl. No. 14/512,267, dated Sep. 1, 2017 (26 pages).

United States Patent and Trademark Office, "Non-Final Office Action", issued in connection with U.S. Appl. No. 14/512,274, dated Nov. 3, 2017 (27 pages).

Salesforce, Inc., "Winter '15-Release-Notes", Dec. 22, 2014 (351 pages) {note: 13 instances of Quick Action, including prior names Other Actions on p. 215 and publisher actions p. 315}.

United States Patent and Trademark Office, "Office Action", issued in connection with U.S. Appl. No. 14/512,240, dated Oct. 15, 2015 (17 pages).

United States Patent and Trademark Office, "Notice of Allowance", issued in connection with U.S. Appl. No. 14/512,240, dated Mar. 16, 2016 (10 pages).

United States Patent and Trademark Office, "Office Action", issued in connection with U.S. Appl. No. 14/512,249, dated Dec. 18, 2015 (15 pages).

United States Patent and Trademark Office, "Notice of Allowance", issued in connection with U.S. Appl. No. 14/512,249, dated May 11, 2016 (14 pages).

United States Patent and Trademark Office, "Final Office Action", issued in connection with U.S. Appl. No. 14/512,230, dated Apr. 27, 2016 (8 pages).

United States Patent and Trademark Office, "Notice of Allowance", issued in connection with U.S. Appl. No. 14/512,230, dated Nov. 8, 2016 (21 pages).

United States Patent and Trademark Office, "Office Action", issued in connection with U.S. Appl. No. 14/512,267, dated Sep. 21, 2016 (29 pages).

United States Patent and Trademark Office, "Office Action", issued in connection with U.S. Appl. No. 14/512,258, dated Sep. 9, 2016 (22 pages).

United States Patent and Trademark Office, "Final Office Action", issued in connection with U.S. Appl. No. 14/512,267, dated Feb. 15, 2017 (17 pages).

United States Patent and Trademark Office, "Notice of Allowance", issued in connection with U.S. Appl. No. 14/512,258, dated May 12, 2017 (15 pages).

United States Patent and Trademark Office, "Final Office Action", issued in connection with U.S. Appl. No. 14/512,263, dated May 24, 2017 (35 pages).

Boykin, et al., Summingbird: A Framework for Integrating Batch and Online MapReduce Computations, Twitter, Inc., Proceedings of the VLDB Endowment, vol. 7, No. 13, 2014 (11 pages).

Haltian LTD., "Thingsee Engine API", Ver 01.00, Mar. 7, 2015 (24 pages).

Salesforce, Inc., "Force.com Canvas Developer's Guide", Version 34.0, Summer 2015, (114 pages).

United States Patent and Trademark Office, "Notice of Allowance", issued in connection with U.S. Appl. No. 14/857,662, dated Oct. 12, 2017 (32 pages).

Davis, Graphite Documentation Release 0.10,0, Sep. 16, 2014 (141 pages).

GitHub exbz Description of Graphite UI, 2014, 8 pgs. [retrieved Sep. 14, 2018] Retrieved from Internet: <https:..github.com/ezbz/graphitus>.

ExactTarget, "The Future of Marketing Starts Here", Mar. 1, 2013, [retrieved Sep. 14, 2018], Retrieved from Internet <http://www.exacttarget.com>, http://web.archive.org/web/20130301133331/http://www.exacttarget.com.

Agrawala, "Animated Transitions in Statistical Data Graphics", Sep. 22, 2009 {retrieved Sep. 14, 2018) Retrieved from Internet <https://www.youtube.com/watch?v=Lk7mIAtEXI&geature=youtu.be> (3 pages).

Segel et al., "Narrative Visualization: Telling Stories with Data", Mar. 31, 2010, http://vis.stanford.edu/papers/narrative (10 pages).

Heer et al., "Animated Transitions in Statistical Data Graphics", Mar. 31, 2007 (8 pages).

Demiralp et al., "Visual Embedding, A Model for Visualization", Visualization Viewpoints, IEEE Computer Graphics and Applications, Jan./Feb. 2014 (pp. 6-11).

Stanford Vis Group/Papers, "Visualization Papers, 2014-2001", retrieved from http://vis.stanford.edu/papers on Sep. 14, 2018 (14 pages).

(56) References Cited

OTHER PUBLICATIONS

"Salesforce Analytics Cloud Implementation and Data Integration Guide", Summer '14 Pilot—API version 31.0, last updated: Sep. 8, 2014 (87 pages).
"Occasionally Connected Applications (Local Database Caching)", downloaded on Sep. 14, 2018, from http://msdn.microsoft.com/en-us/library/vstudio/bb384436(v=vs.100).aspx.
EdgeSpring Legacy Content, approx. 2012 (97 pages).
Dumais et al., "Stuff I've Seen: A System for Personal Information Retrieval and Re-Use", SIGIR, 2003 (8 pages).
United States Patent and Trademark Office, "Non-Final Office Action", issued in connection with U.S. Appl. No. 14/876,427, dated Dec. 13, 2017 (12 pages).
United States Patent and Trademark Office, "Notice of Allowance", issued in connection with U.S. Appl. No. 14/876,427, dated Jul. 12, 2018 (15 pages).

* cited by examiner

FIG. 1 – Analytics Environment

FIG. 2 – Data Visualization Context

FIG. 3 Example Actions

FIG. 4 Example Quick Actions Available when Open Record is Selected

FIG. 5 Example of Account Detail

FIG. 7 Example Table

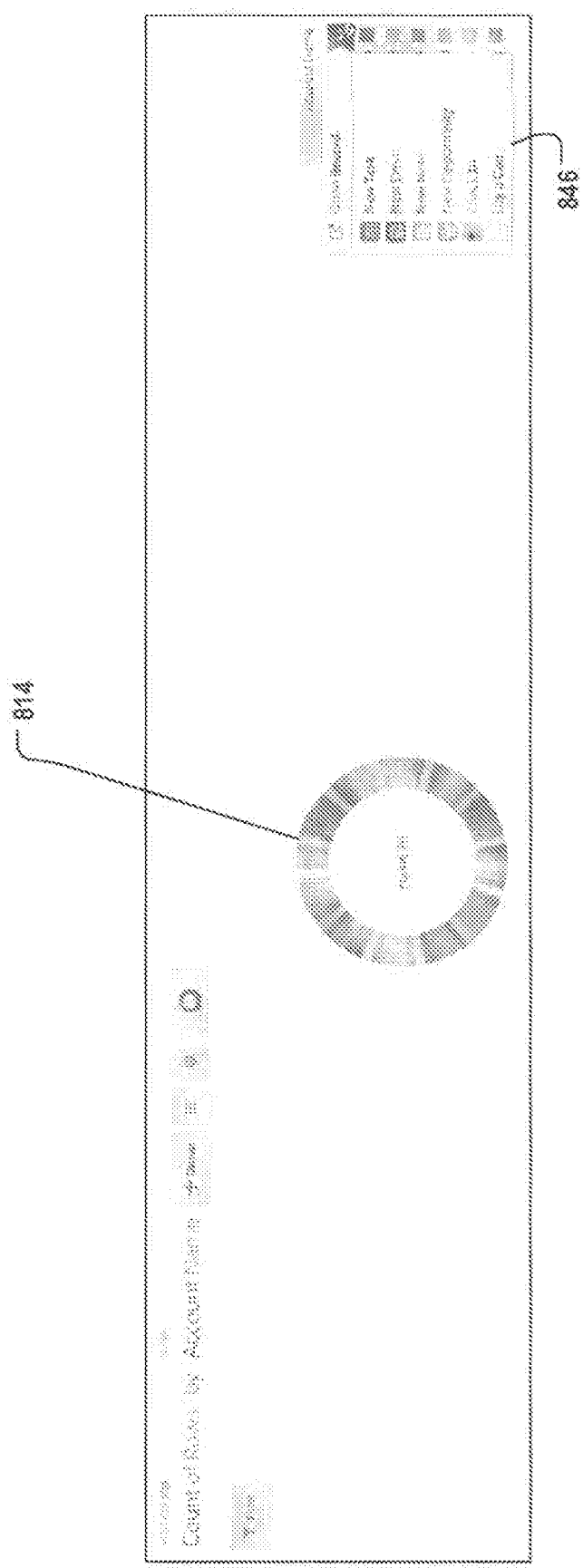
FIG. 8 Donut Visual Representation with Separate Quick Action Legend

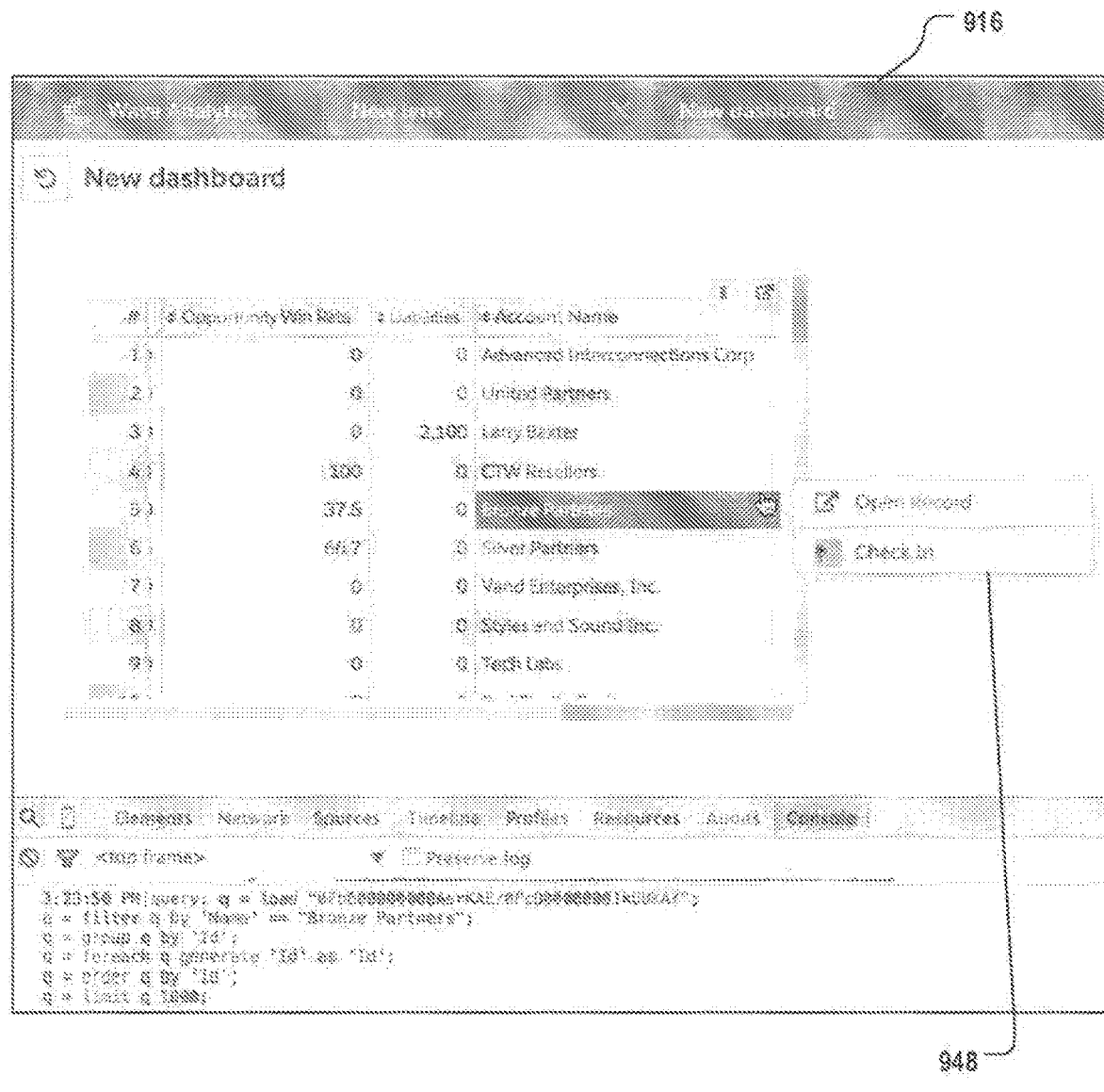
FIG. 9 New Dashboard Example

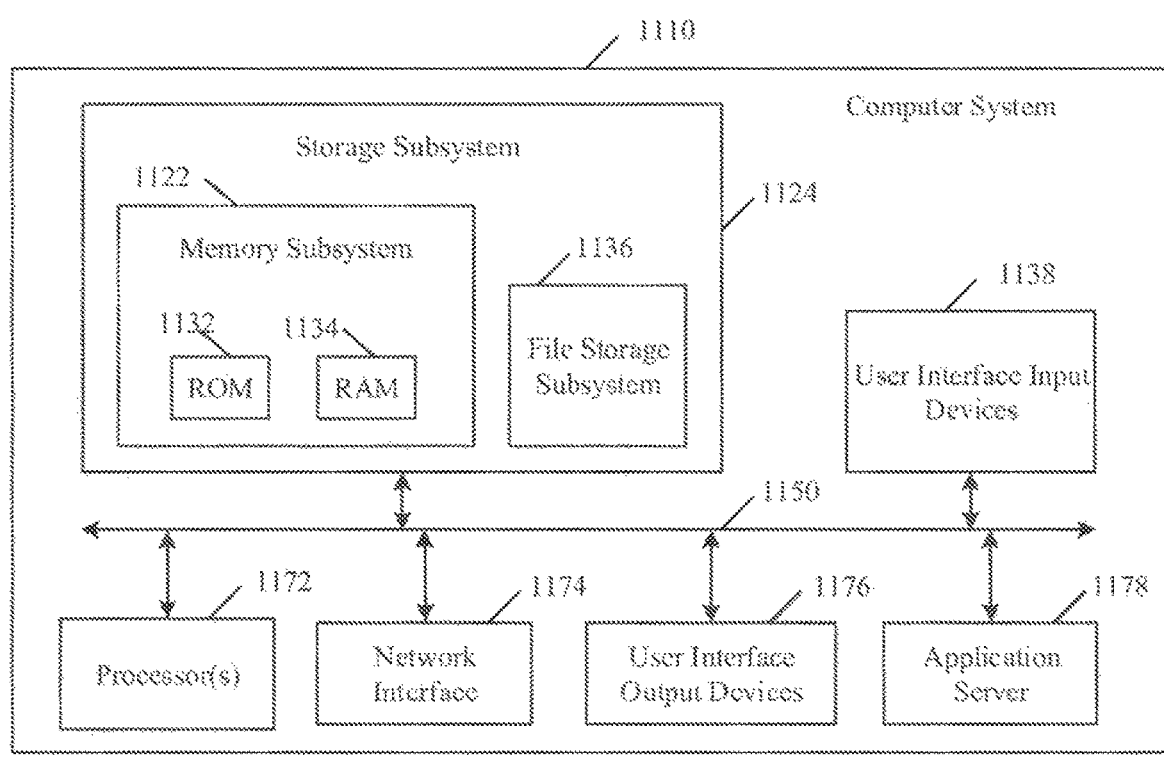
FIG. 11 Computer System

SYSTEMS AND METHODS FOR MAKING VISUAL DATA REPRESENTATIONS ACTIONABLE

RELATED APPLICATION

This application is a continuation of U.S. patent application Ser. No. 14/876,427, by Pominville, et al., entitled "Systems and Methods For Making Visual Data Representations Actionable," filed Oct. 6, 2015, which claims benefit to U.S. Provisional Application 62/220,886, entitled, "Systems and Methods for Making Visual Data Representations Actionable," filed on Sep. 18, 2015. The provisional application is hereby incorporated by reference for all purposes.

This application is also related to U.S. patent application Ser. No. 14/512,258, entitled, "Visual Data Analysis with Animated Informational Morphing Replay," filed on Oct. 10, 2014. This non-provisional application is hereby incorporated by reference for all purposes.

FIELD OF DISCLOSURE

The disclosed technology includes systems and methods for making visual data representations actionable.

Businesses are faced with increasing consumer demands for dynamic, personalized multi-channel interactive experiences. Meanwhile, website, network and device complexities impact performance, which in turn impacts revenue. Insight data analysis supports data exploration, dashboard building, and declarative representation of data visualizations. Cloud-based delivery of data visualizations can help users sell smarter, grow faster, and service better.

The disclosed technology makes it possible for users to customize their applications to make visual representations of data in a company's records or other websites actionable. Using the disclosed technology, users can configure data visualization Lenses to link directly to records in both internal datasets and third party sites. For example, actions can be customized to look up employees in Workday®, expense reports in Concur®, or benefits in AnyPerk®—an employee engagement platform that helps manage and deliver perks and discount programs to maximize employee happiness in companies. That is, customized actionable data visualizations make it possible for companies to close the loop by turning insight into action across their customer platform.

The disclosed technology makes it possible to drill into data, identify records and take action directly, enhancing customized data visualization representations. An opportunity also alises to provide links to records within a company's third party sites via actionable visual data representations.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 7. shows an example of a raw data table with open vs. closed opportunity data.

FIG. 8. displays an example visualization of a "count of rows by account name" pie chart with an actionable side legend.

FIG. 9 shows an example new dashboard with two actionable dropdown menu options.

FIG. 11 is a block diagram of an example computer system for an environment for making visualization representations actionable.

DETAILED DESCRIPTION

Figure 1:
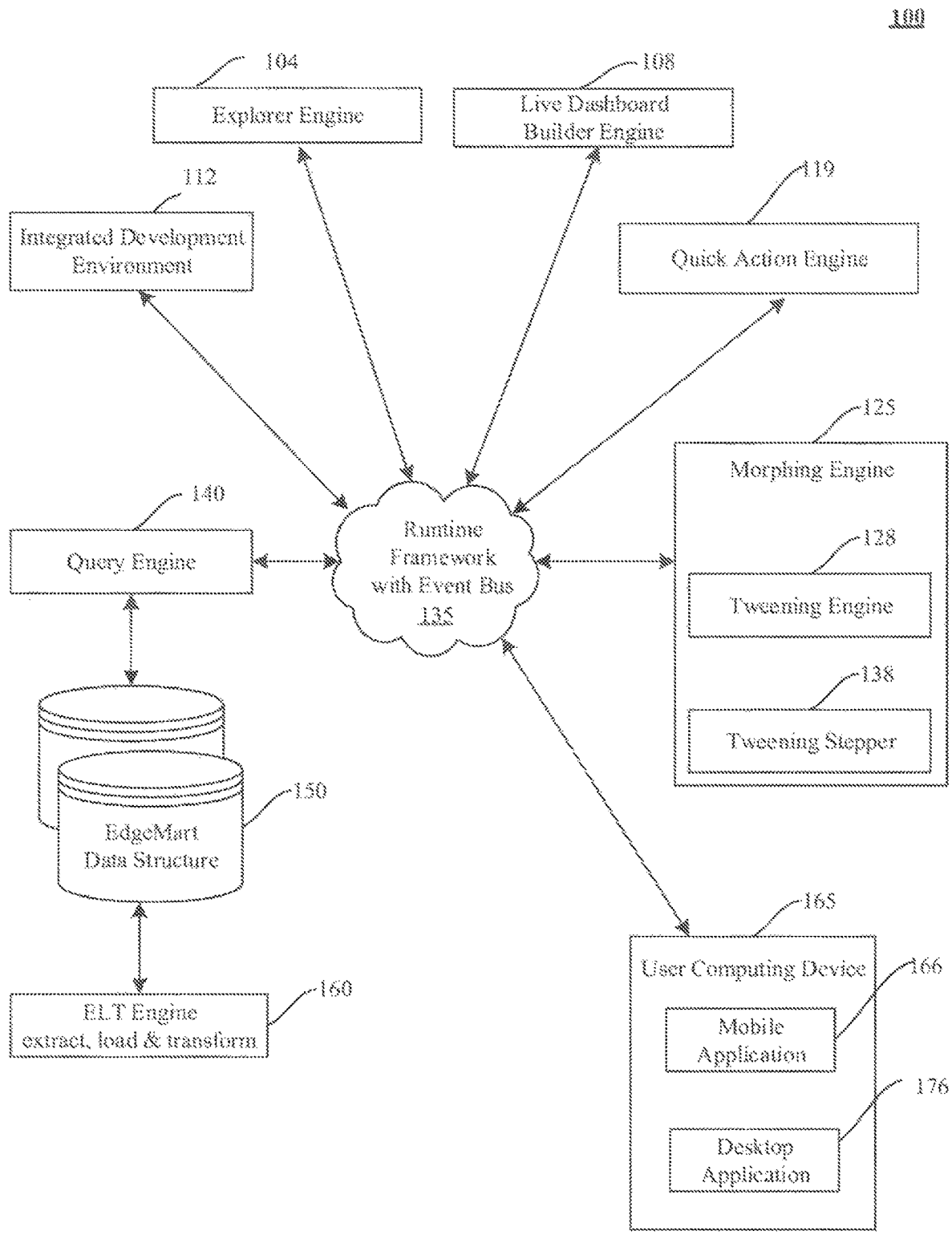
FIG. 1 illustrates one implementation of an environment for making visualization representations actionable.

The following detailed description is made with reference to the figures. Sample implementations are described to illustrate the technology disclosed, not to limit its scope, which is defined by the claims. Those of ordinary skill in the all will recognize a variety of equivalent variations on the description that follows.

Insight data analysis supports data exploration, dashboard building, and declarative representation of data visualizations. During exploration and replayed exploration, changes in data filtering, grouping and presentation format are animated, showing how a change redistributes data values. Singularly and in combination, these features can contribute to successful data analysis and presentation.

During single panel data exploration and replay, new data visualizations are animated as they are designed. Drilling down on a data segment, for instance, causes the original data segment to subdivide according to the selected regrouping and visually progress through animated subdivision growth and rearrangement into a more granular data visualization. This helps the analyst understand the data, and subsequently, explain important data segments to colleagues who are interested in the process as well as the numbers.

Analysts can assemble dashboards of three or more charts that provide alternative visualizations of linked data. As an analyst creates a new chart, the system immediately applies the declared queries, widgets and bindings to the EdgeMalt(s) involved to generate data visualizations. Notional or generic representations of pie and bar charts are replaced when applying this technology by live data visualizations, without requiring a user to switch from authoring/editing mode into an execution or user mode. (In this disclosure, "pie" and "donut" are used interchangeably to refer to a circular chart with wedges or segments. We recognize that many readers would call the chats in the figures donuts instead of pies.)

An assembled dashboard can be compactly represented by declarative data objects that fully describe charts by their properties. A widget that implement a chart is capable of translating the declarative data object into a data visualization. A selected widget, such as a pie chart widget, has a handful of properties that control how the widget binds to a query and displays data.

Exploration, both original and replay, benefits from animated visualization. Consider drill down and regrouping as a first example. Consider regional win rates on sales proposals worldwide. If Asia Pacific has the best success, an analyst can drill down into the Asia Pacific data several different ways to see what drives success. The analyst looks at a pie chart, for instance, and selects the Asia Pacific segment, choosing to group the data by industry type, with the bar chart visualization. The system responds by subdividing the Asia Pacific arc by industry type and animating the projection of sub-arcs into the bars of a bar c chart. The sub-arcs lengthen, straighten and reposition during the animation. The analyst can see in the animation how the industry type bar chart visualization is derived from the regional data. The animation speed can be delivered more slowly or quickly, as suits the circumstances.

The system generates declarative data objects to represent the visualizations, both for replay of data exploration and for dashboards. Dashboards and exploration sequences can be recreated from declarative objects that represent the queries, visualizations, groupings and bindings explored by an analyst-author. Declarative objects specify properties to be applied and values of the properties. A single scene or a dashboard of scenes is represented by a set of declarative objects. Declaration of these objects allows the runtime to create a limited but powerful set of data visualizations during exploration, creation, replay and user dashboard viewing. The vocabulary for declarative data objects is manageable because the declarative objects are special purpose with options capable of specifying queries, bindings and facets that the provided widgets understand and can consume to produce specific data visualizations. Properties of declarative objects can be specified using key-value pairs, as illustrated in U.S. patent application Ser. No. 14/512,258, entitled, "Visual Data Analysis with Animated Informational Morphing Replay".

Analysts who assemble dashboards that represent customer analytics find it useful to be able to customize their user experience. For example, a sales rep for the Eastern region of a fortune 100 company opens an opportunity dataset and explores by adding measures, groups and filters. As part of exploration they discover some insights related to an account, and would like to click on the account name to view the account within Salesforce to learn more. In another example, a team manager, when viewing a dashboard on retention risk using a Workday dataset, notices an employee who is at high risk and expensive to replace. The manager would like to click on the employee's name within the table to view the employee's profile within the Workday system. In a third example, a sales manager links to a team ranking to show a list of top or bottom players. Since these are best done in a horizontal bar chart, it would be nice to have a profile pie alongside their name and the ability to click to view their profile or contact them. The next chart type would probably be a compare table.

An additional situation in which customization becomes useful is for a dashboard builder building an executive dashboard to provide global insights into their top accounts. The builder Likes to include a toggle selector for accounts that include the account Logos. In another instance, a sales manager who filters most of their dashboards by sales rep, could use a profile pie in the header to remind them of whose analytics are being viewed. In yet another example, a sales manager, as part of an exploration, narrows down to a couple of problematic accounts within a table. For a specific account, within the table, the manager would like to take action and add a task to the account to execute specific actions. A marketing manager may find it useful to facet over customers using specific datasets and select the subset that is compelling and drop the results into a marketing cloud story. In another case, a user may want to identify non-401 k customers and then market to them and track their activity. A sales director at a large company may find bulk workflow actions useful to identify segments that are disproportionately large, and then reassign them—potentially doing workflows based upon these automatically. An admin might Like to be able to add, edit or delete dimension properties via a ill, and a dashboard builder may find it useful to be able to override dimension properties to disable links and provide alternate image references.

An opportunity arises to make available customizable quick action menus in Lenses and dashboards to let customers take advantage of so-called quick actions on visualization objects, and to access records from the company's database or elsewhere on the web. Quick actions include adding a task, a campaign, an event, or a note and can be applied to lenses and dashboard objects in charts and tables at field level. Developers or administrators at a company, or independent software vendors (ISVs) can edit the extended metadata (XMD) file for a dataset to customize dashboard elements, creating menus that appear with popular interface elements of data visualization charts and tables. Quick action definition is at the data source level, and can be leveraged by any lenses or dashboards built on the data source. If the XMD for a dataset is modified, any UI visualization that uses the dataset uses the new version. Actionable visual representations can also include mapping of a company's org IDs to their URLs so that a link to a company record from a multi-org dataset resolves to the correct org instance for that record.

The disclosed technology, for making visual data representations actionable, includes storing definitions of one or more fields and keys to be associated with quantifiable items to be represented by visual objects in a data visualization, and automatically transmitted upon selection of an action trigger control. The technology includes, upon receipt of a query, creating a set of quantified items responsive to the query; and causing display of multiple visual objects that represent the quantified items in the set, with selectable trigger controls for each quantified item in the data visualization. The technology includes receiving data indicating user selection of a trigger control associated with a selected quantified item in the data visualization, the data accompanied by at least one pair of the defined fields and keys for the selected quantified item; and launching an action and either creating a record of the action, or using the accompanying defined fields and keys to associate the record with preexisting records in a database.

Detailed examples are provided below.

The disclosed technology for making visual data representations actionable can be rendered natively on multiple platforms that run different operating systems.

Examples of systems, apparatus, and methods according to the disclosed implementations are described in a "sales opportunity" context. The examples of sales contacts such as leads, prospects and accounts are used solely to add context and aid in the understanding of the disclosed implementations. In other instances, data with numerous elements may include airline flight arrival and departure times, medical records of cancer symptoms and treatments, insurance claims, customer service call routing, literacy reporting across the globe, etc. or any data that would have a significant number of features. Other applications are possible, so the following examples should not be taken as definitive or limiting either in scope, context or setting. It will thus be apparent to one skilled in the art that implementations may be practiced in or outside the "sales opportunity" context.

Environment

FIG. 1 illustrates one implementation of an analytics environment 100 that includes a quick action engine 119 for adding and customizing links and quick actions. FIG. 1 also includes a runtime framework with event bus 135 that manages the flow of requests and responses between a user computing device 165 mobile application 166 or desktop application 176, an integrated development environment 112, and a query engine 140.

Data acquired (extracted) from large data repositories is used to create "raw" EdgeMart data structures 150—read-only data structures for analytics—that can be augmented, transformed, flattened, etc. before being published as customer-visible EdgeMarts for business entities. A query engine 140 uses optimized data structures and algorithms to operate on the highly-compressed EdgeMarts 150, delivering exploration views of this data.

A disclosed live dashboard builder engine 108 designs dashboards, displaying multiple lenses developed using the Explorer engine 104 as real-time data query results. That is, an analyst can arrange display charts for multiple sets of query results from the Explorer engine 104 on a single dashboard. When a change to a global filter affects any display chart on the dashboard, the remaining display charts on the dashboard get updated to reflect the change. Accurate live query results are produced and displayed across all display charts on the dashboard.]

The EQL language is a real-time query language that uses data flow as a means of aligning results. It enables ad hoc analysis of data stored in EdgeMarts. A user can select filters to change query parameters and can choose different display options, such as a bar chart, pie chart or scatter plot-triggering a real-time change to the display chart-based on a live data query using the updated filter options. An EQL script provides a sequence of statements that are made up of keywords (such as filter, group, and order), identifiers, literals, or special characters. EQL is declarative: you describe what you want to get from your query. Then, the query engine will decide how to efficiently serve it.

A runtime framework with an event bus 135 handles communication between a user mobile application 166 or a desktop application 176 on a user computing device 165, a query engine 140, and integrated development environment 112, which provides a user interface (UI) for creating actionable object-specific quick actions for visual representations of animated data visualizations that can be viewed via morphing engine 125.

The morphing engine 125 receives a request from the event bus 135, and responds with a first chart or graph to be displayed on the live dashboard 115. Segments of a first chart or graph are filter controls that trigger generation of a second query upon selection by a user. Subsequent query requests trigger controls that allow filtering, regrouping, and selection of a second chart or graph of a different visual organization than the first chart or graph.

The disclosed morphing engine 125 includes tweening engine 128 and tweening stepper 138 that work together to generate pixel-level instructions—intermediate frames between two images that give the appearance that the first image evolves smoothly into the second image. That is, a shape can be described by a radius and an angle. The tweening engine 128 calculates the locations for the pixels and the tweening stepper 138 delivers an animation projection sequence for morphing a display chart from a first visualization lens to a second visualization option. The projections between the start and destination frames create the illusion of motion that gets displayed on the dashboard when a user updates data choices.

The overall display, referred to as a dashboard, can include one or more lenses—each lens can include a live chart, selector, text or a number. Integrated development environment 112 includes a UI for creating actionable object-specific quick actions for visual representations. In one example implementation, JSON can be used to express the generated non-procedural data structures.

Quick action engine 119 includes a quick action class used to generate actionable visual data representations. Definitions of display fields paired with unique 10 field are stored and automatically transmitted upon selection of a quick action trigger control.

In other implementation s, environment 100 may not have the same elements as those listed above and/or may have other/different elements instead of, or in addition to, those listed above.

Figure 2:
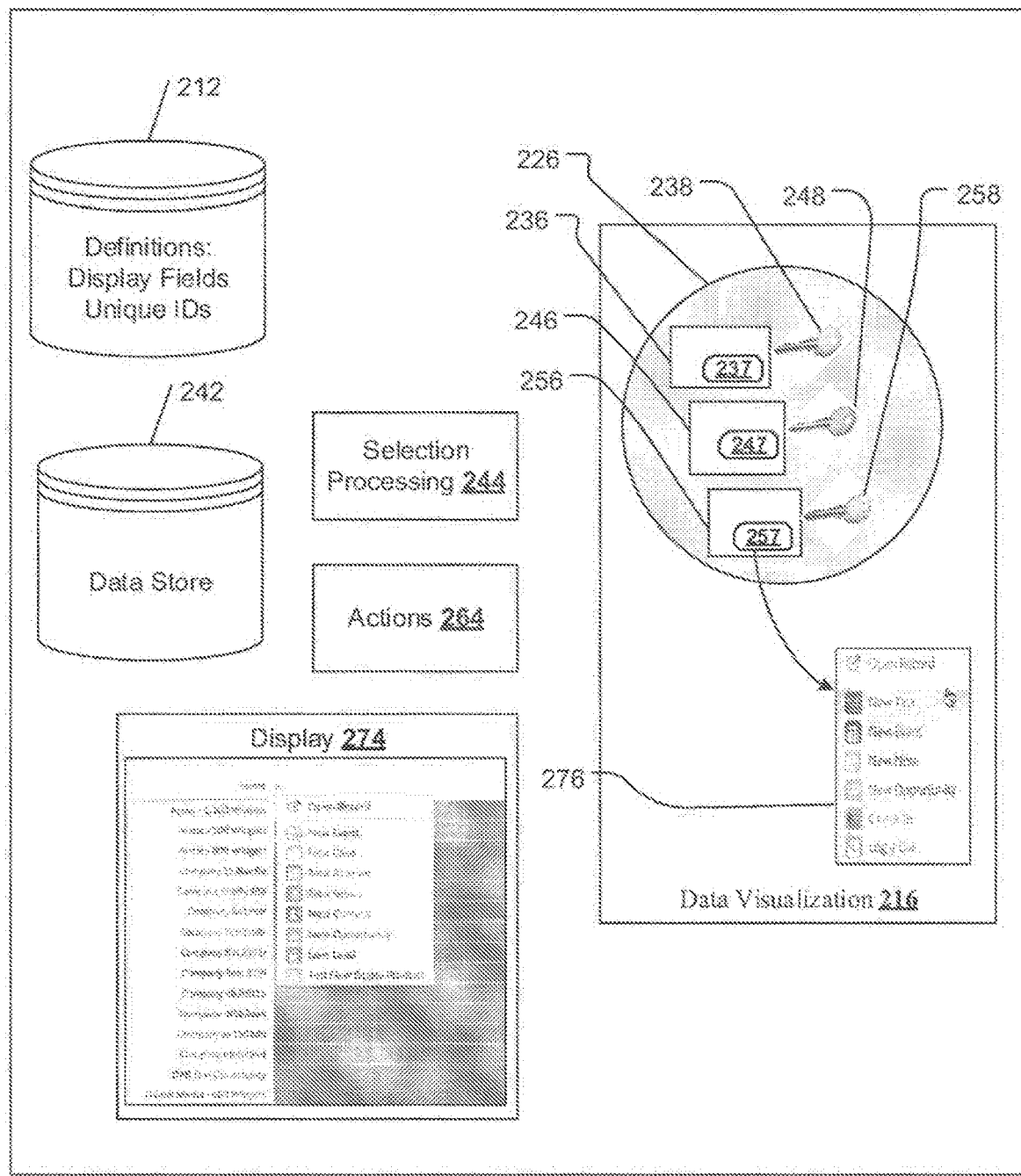
FIG. 2 shows an example context for making data visualizations actionable.

Actionable data visualizations for quick actions operate directly from visual data representations, without initiating new queries. FIG. 2 shows a data visualization context that includes definitions data store 212 with definitions of display fields paired with unique ID fields. The unique ID fields hold unique ID keys associated with quantified items represented by visual objects in a data visualization 216 within a data context. A set of quantified items 226 includes visual objects 236, 246 and 256, with associated unique ID keys 238, 248 and 258 and trigger controls 237, 247 and 257. In one example, when data that indicates user selection of trigger control 257 associated with visual object 256 in the set of quantified items 226 in data visualization 216 is received at selection processing 244, the selected quick action 276 launches using the unique ID key 258 and applicable data context in data store 242.

Display 274 can be customized to show the selected quick action 276 with multiple action choices, upon receipt of data indicating the action has been selected. Actions 264 can include logging a call, adding a check in, entering a new opportunity, event, task or note, posting a question. In some cases, the applicable data context is the query data context and default usage of the query data context is not overridden by the stored definitions 212. In other cases, the applicable data context is an external data context other than the query data context, and the stored definitions 212 include an invocation string that specifies the external data context in which the unique ID field is recognized in the external data context. In this case, the invocation string uses the unique ID key to access the external data context.

Figure 3:
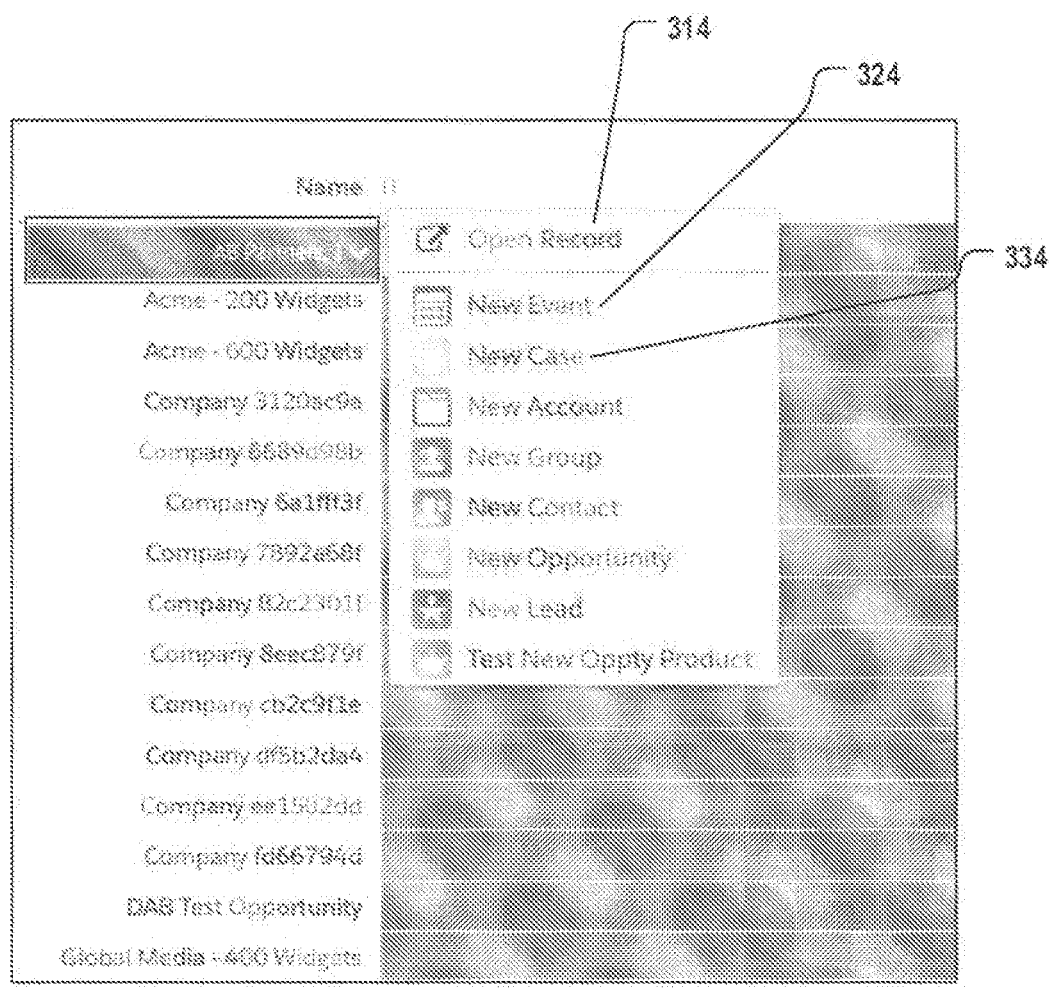
FIG. 3 shows an example list of available quick actions.
Figure 4:
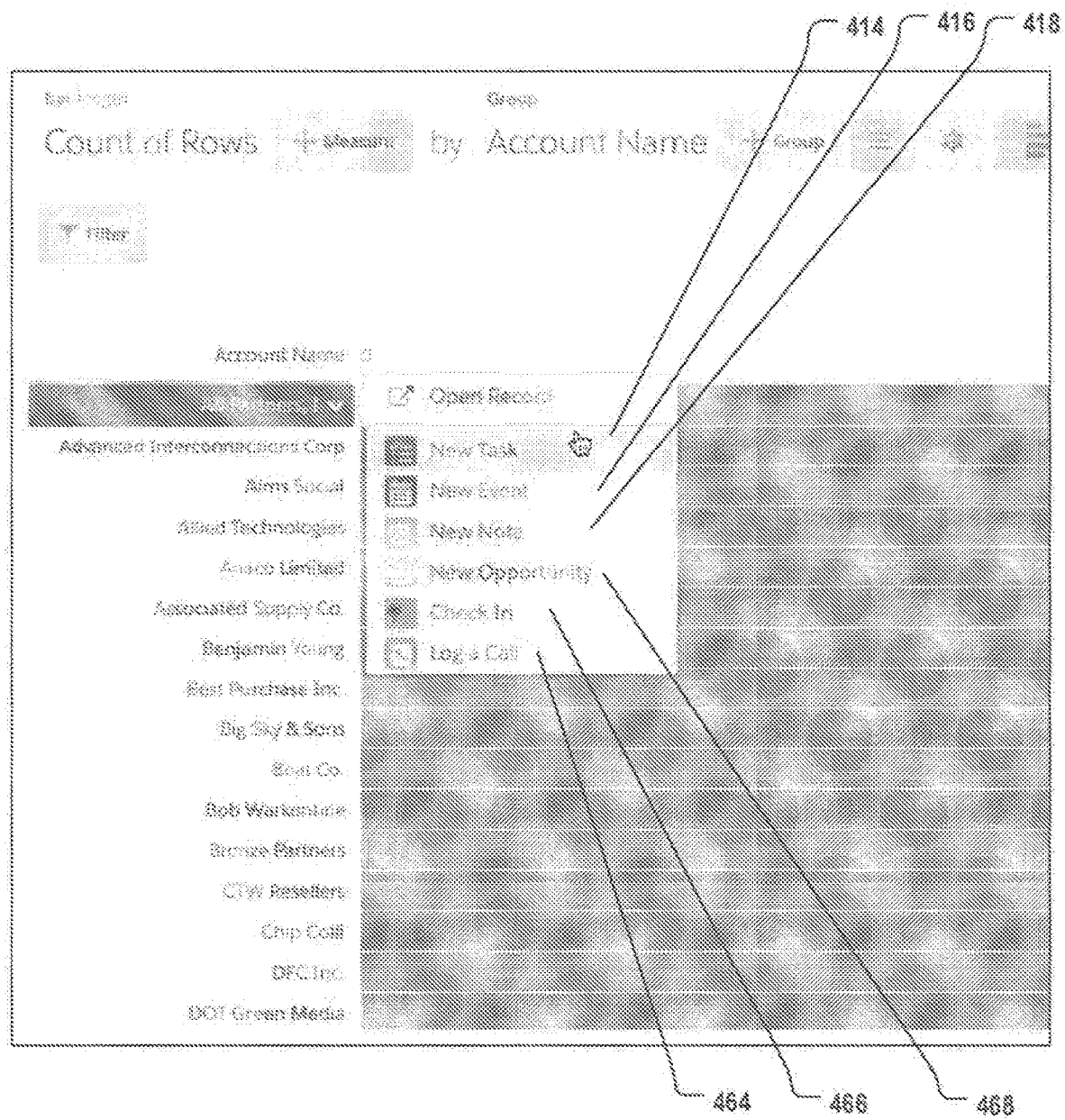
FIG. 4. shows example quick actions available when open record is selected.

FIG. 3 shows example actions that can be customized; among the actions are open record 314, new event 324, and new case 334. Actions are configurable. FIG. 4 shows a display of quick actions available when AB Partners open record 314 is selected. These options include adding a new task 414, a new event 416, a new note 418, a new opportunity 464; or check in 466 or log a call 468. Each configurable action can link into a specified instance of a company org or can link into an external system. In one example, a link to a record in Google and an optional tooltip can be the external link.

Figure 5:
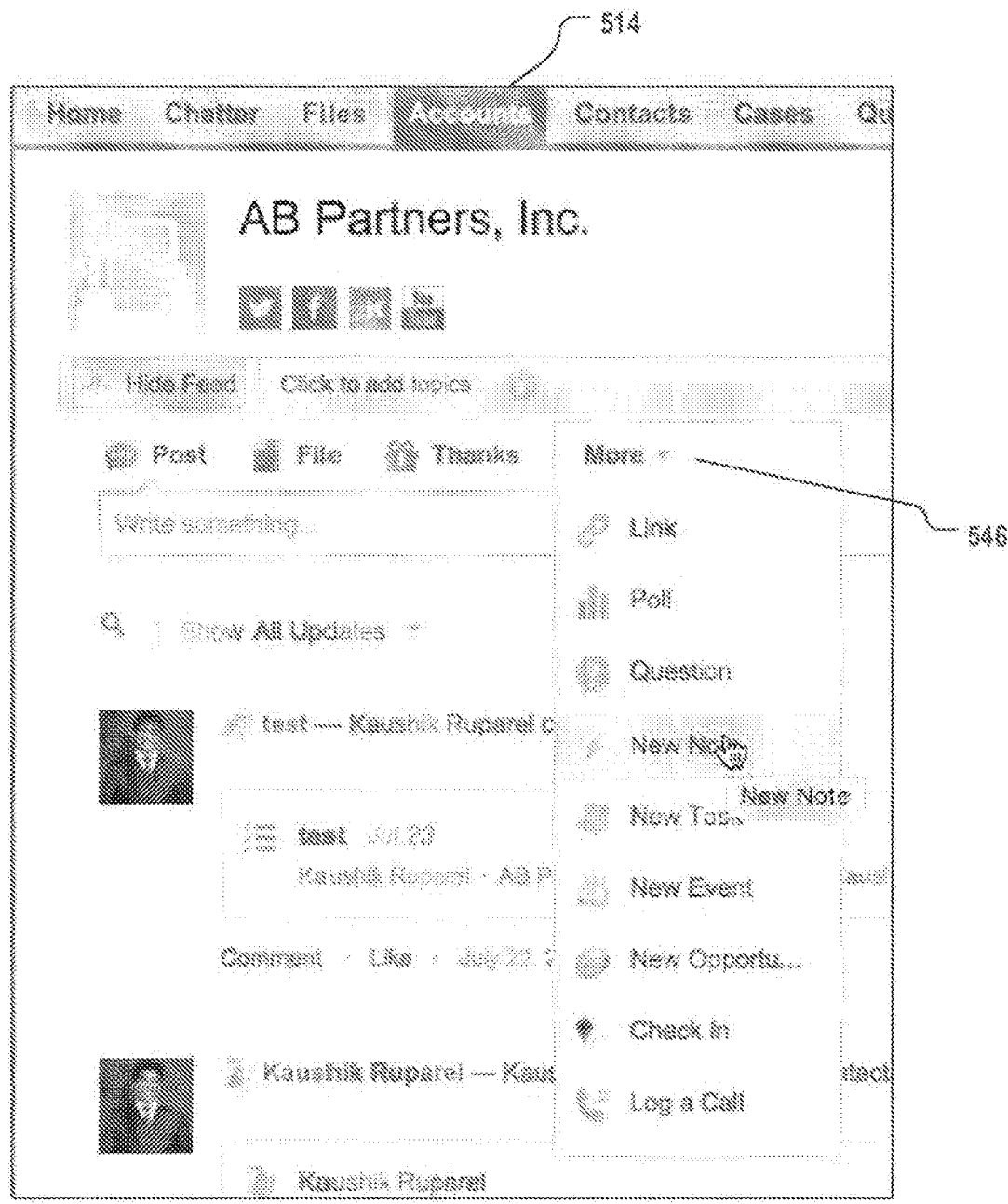
FIG. 5. shows example action details for an open record for a company.

FIG. 5 shows example account detail for a company, AB Partners, Inc., with a dropdown list of "more" actions 546 that can be customized for accounts 514, including adding a link, a poll, a question, a new note, a new task, a new event, or a new opportunity, or check in or log a call.

Figure 6:
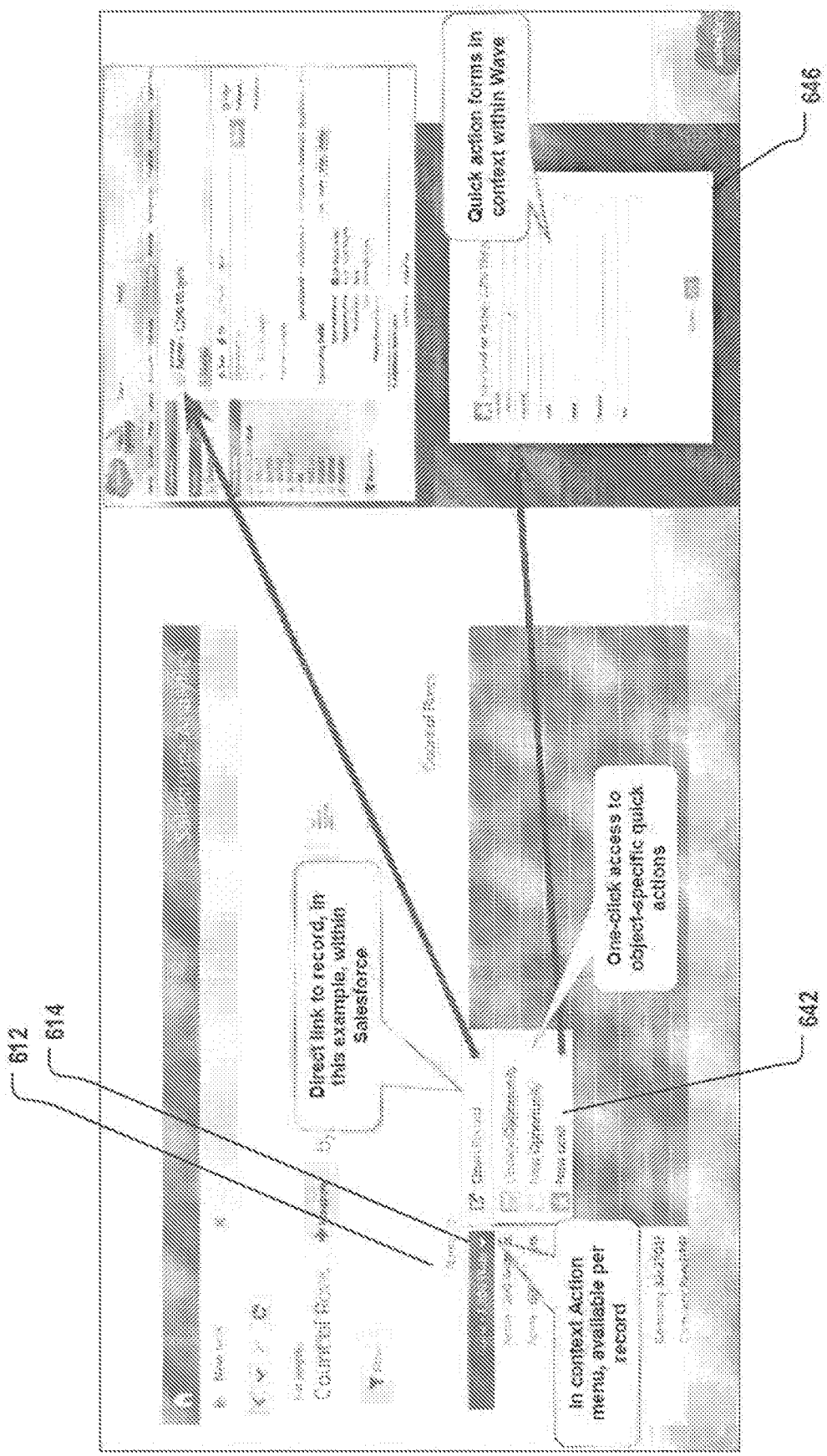
FIG. 6. displays an example workflow with open record and new lead screens.

FIG. 6 shows the flow from a contextual action dropdown menu, available for company data record 614. The example interface includes one-click access to object-specific quick actions that have been set up in the XMD for an open record. Object-specific quick actions make it possible for users to create records that have automatic relationships to other records, make changes and updates to specific records, and interact with records in ways they define. In one example, the selection of a new lead 642 triggers display of a visual representation of a quick action form 646 for a new lead, customized to the selected company, Acme—1,200 Widgets.

When a dashboard user configures an action, they can specify an ID—for example an account ID or ownerID. Name; and can link back to the owner page of the company, and can use column values. In one implementation of the technology, variables to populate quick actions can be specified by editing the extended metadata (XMD) dataset. Lenses and dashboards are based on the dataset. An example for an XMD dataset, AccountSFDCI.xmd.json, is listed below. In this example, the recordIDField specifies the ID column that must be present in the dataset that makes the reference; the column ID specifies actions and URLs; and the Name field 612 is the account name the user can group by to customize actions. The dataset is from a workflow, in this example.

{"dimensions":[{"recordIDField": "Id", "field": "Name"}]}

In one example, an end user can access a rendered quick action for a data visualization by right clicking to view new information. In another example, when a cursor hovers over a field that includes an actionable quick action, a popup can be displayed with detailed information about the field under the cursor. Integrated existing actions can display information for a specific user and record. When a and user profile is passed, actions that have been configured can be displayed in a modal in an iFrame; an update log can be created, etc. These actionable quick actions can be implemented on any object, or can be added to a custom object. In a sales opportunity context, example selectable quick actions include a log-a-call action, create-new-case action, create-new-contact action, create-new-event action, create-new-lead action, create-new-opportunity action, and create-new-task action.

In an example implementation, a modal can be used as a UI for end users to disambiguate when multiple accounts or records map to the same name. For example, if a dataset includes two Jane Doe names with different IDs, a modal popup can ask the end user to choose one; or can display the data in multiple columns to assist the user in choosing the correct record ID.

Developers, admins and ISVs can modify the XMD file for a dataset, using customized quick action menus to access pre-defined actions from any dimension value in a table or chart within a lens or dashboard. Example actions can be related to objects that represent accounts, cases, leads, and opportunities. Developers, admins and ISVs can also create a new action, and can access company records or an external website that uses HTTP or HTTPS protocols; through the XMD file dimensions section—specifying whether the menu includes all or a subset of actions, and a link to a company record.

In one example implementation, a list of dimensions and measures to be hidden in the user interface can be specified, as shown below.

```
"hide_dimensions":
[ "Owner-Email"
],
"hide_measures": [
 "TotalMRR"
```

In an example implementation, dimensions specifies the field and recordIdField as ID, to add a menu with the complete set of available create actions and a link to a record, as listed below. In the example, field is the name of the dimension on which the menu appears in dashboard and lens charts and tables. Setting recordIdField enables the create actions and a default link in the menu that opens a record within the dataset for the lens or dashboard. The link uses the current instance and the dimension specified in the recordIdField.

```
{
    "dimensions":
    [
     {
      "field": "Name",
      "recordIdField": "Id"
     }
    ]
}
```

Another example shows a way to specify a linkTemplate to override the default link, which is "/{{row.recordid-Field}}". Listed below is an example showing a link to a record in Google and an optional tooltip. Another example option can include setting the link to a company record.

```
"field": "AccountId",
"l inkTemplate":
    "http://www.google.com/?q =AccountID= {{row.Accountid}}
    &AccountName= {{row.Accountld.Name}} ",
"recordIdField": "Accountld.Name",
"linkTooltip": "Custom AccountId Tooltip for Google"
```

For some implementations, a customization can include the option of not displaying the open record link, activated by setting a linkTemplateEnabled filed to false. Similarly, an ActionsEnabled field can be set to false to disable the display of actions in the menu. In some instances, a dimension value is associated with multiple IDs and is not unique. For example, an opportunity with the name "acme" has multiple opportunity IDs (and records). But the action or link can only be directed to one record. In this scenario, the user is given a choice of associated records in a modal. Listed below is an example showing recordDisplayFields.

```
"field": "Accountld.Name",
"recordIdField": "Accountld.Id"
"recordDisplayFields": ["Case_ID"," Account_Name","Case_Owner"]
```

A complete example XMD file for a dataset that includes quick action menus on several fields is listed below.

```
{
    "dimensions":
    [
     {
      "field": "Name",
      "recordIdField": "Id"
```

-continued

```
    },
    {
        "field": "AccountId.Name",
        "recordIdField": "AccountId.Id",
        "linkTooltip": "Custom AccountName Tooltip"
        "recordDisplayFields": ["Name","Owner"]
    },
    {
        "field": "Case_Subject",
        "link:Template":
        "http://www.google.com/?q=AccountID={
        {row.Case_Id}}
        &AccountName= {{row.Case_Owner}}",
        "recordIdField": "Case_Jd",
        "linkTooltip": "Custom CaseJd Tooltip for google"
    },
    {
        "field": "Id",
        "sfdcActions": [
            {
                "name": "NewAccount"
            },
            {
                "name": "NewLead"
            }
        ],
        "recordJdField": "Id",
        "sfdcActionsEnab led": tme,
        "linkTemplateEnab l ed": false,
        "link.Tooltip": "Custom Tooltip for Opp Id"
        }
    ]
}
```

In the example listed above, field is the name of the dimension on which the link appears in dashboard and lens charts and tables. LinkTemplate is the destination of the link. LinkTooltip is optional and can contain text that appears when a cursor hovers over the link.

A link to a company record can be added to a menu. To link to a company record within the current organization instance, configure LinkTemplate as listed below.

"link.Template": "/{{row.Id}}"

In the example, I sets the link's destination to the organization and {{row.Id}} is the record to which to link. Id is the dimension that's looked up in the company, so specify a dimension that exists in the dataset and that returns results when queried, such as an ID or case number. The chart or table would contain a link from an account name (such as Acme). If the account ID for Acme is 001 1a0000040K.Ez on an instance located at https://na24.salesforce.com, the URL generated when the user clicks Acme is https://na24 salesforce.com/001la0000040K.Ez.

Similarly, a link to an external website can be added to a menu, and information such as a username can be passed to the linked website, by configuring Link. Template as listed below.

"linkTemplate": "https://www.ExtemalWebsite.com/users/{{row.username}}"

In this example, {{row.username}} passes a username through the URL of an external website; for example, if the username is dsmith, the URL generated by clicking dsmith is https://www.ExternalWebsite.com/users/dsmith. LinkTemplate must specify "http://{{row.websiteURL}}" or "https://{{row.websiteURL}}" for the link to work In general, any static URL can be specified in the XMD file as long as it starts with http:// or https://, and inserts a dynamic value using {{row.}} notation.

Figure 7:
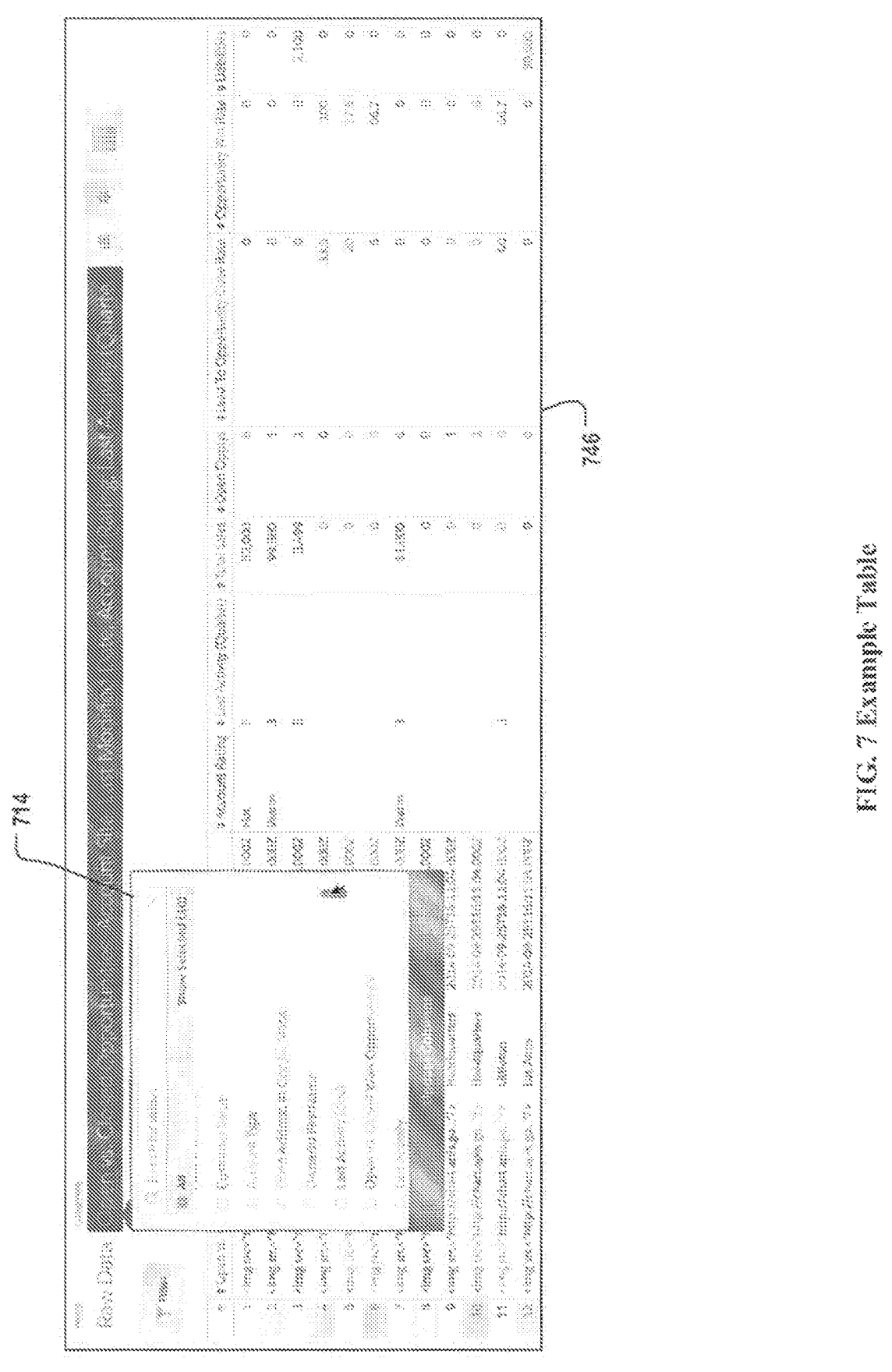

One implementation includes making data table representations actionable. FIG. 7 shows a "raw data table" 746 and key fields in a dropdown list 714—listing options for linking to a data record using a specific key, such as owner ID or account type. These variables can be used for constructing a URL that determines the action.

FIG. 8 shows another implementation of a data visualization dashboard: a donut lens 814 that does not include labels, so an associated actionable visual representation of a menu appears as a legend 846 on the side.

Developers, admins and ISVs can al so create custom actionable visual representations. FIG. 9 shows an example new dashboard 916 with two quick action options 948—an open record or check in.

Workflow

Figure 10:
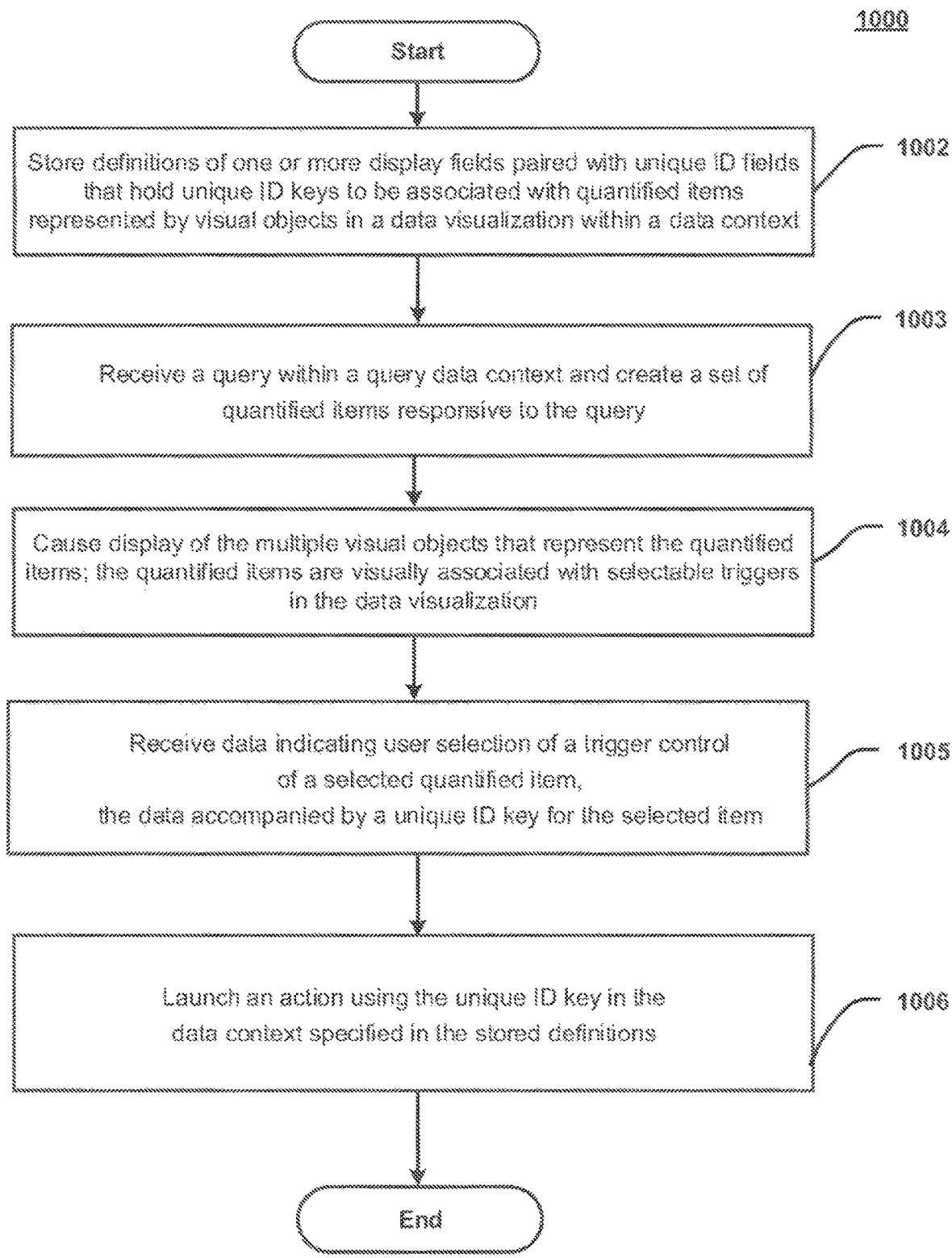
FIG. 10 is an example workflow for making visual representations actionable.

FIG. 10 shows the flow 1000 of one workflow for making data visualizations actionable. Other implementations may perform the steps in different orders and/or with different, fewer or additional steps than the ones illustrated in FIG. 10. Multiple steps can be combined in some implementations.

At action 1002 definitions of one or more display fields paired with unique JD fields that hold unique ID keys to be associated with quantified items represented by visual objects in a data visualization within a data context are stored.

At action 1003, a query within a query data context is received and a set of quantified items responsive to the query is created.

At action 1004, display of the multiple visual objects that represent the quantified items in the set is caused, wherein the quantified items are visually associated with selectable triggers in the data visualization.

At action 1005, data indicating user selection of a trigger control of a selected quantified item is received. The received data is accompanied by a unique ID key for the selected item.

At action 1006, an action using the unique ID key in the data context specified in the stored definitions is launched.

Computer System

FIG. 11 is a block diagram of an example computer system 1100 for implementing an environment for making visual representations actionable. The processor can be an ASIC or RISC processor. It can be an FPGA or other logic or gate array. It can include graphic processing unit (GPU) resources. Computer system 1110 typically includes at least one processor 1172 that communicates with a number of peripheral devices via bus subsystem 1150. These peripheral devices may include a storage subsystem 1124 including, for example, memory devices and a file storage subsystem, user interface input devices 1138, user interface output devices 1176, and a network interface subsystem 1174. The input and output devices allow user interaction with computer system 1110. Network interface subsystem 1174 provides an interface to outside networks, including an interface to corresponding interface devices in other computer systems.

User interface input devices 1138 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1110.

User interface output devices 1176 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as audio output devices. In general, use of the term "output device" is intended to include all possible types of devices and ways to output information from computer system 1110 to the user or to another machine or computer system.

Storage subsystem 1124 stores programming and data constructs that provide the functionality of some or all of the methods described herein. This software is generally executed by processor 1172 alone or in combination with other processors.

Memory 1122 used in the storage subsystem can include a number of memories including a main random access memory (RAM) 1134 for storage of instructions and data during program execution and a read only memory (ROM) 1132 in which fixed instructions are stored. A file storage subsystem 1136 can provide persistent storage for program and data files, and may include a hard disk drive, a floppy disk drive along with associated removable media, a CD-ROM drive, an optical drive, or removable media cartridges. The software used to implement the functionality of certain systems may be stored by file storage subsystem 1136 in the storage subsystem 1124, or in other machines accessible by the processor.

Bus subsystem 1150 provides a mechanism for letting the various components and subsystems of computer system 1110 communicate with each other as intended. Although bus subsystem 1150 is shown schematically as a single bus, alternative implementations of the bus subsystem may use multiple busses.

Computer system 1110 can be of varying types including a workstation, server, computing cluster, blade server, server farm, or any other data processing system or computing device. Due to the ever-changing nature of computers and networks, the description of computer system 1110 depicted in FIG. 11 is intended only as one example. Many other configurations of computer system 1110 are possible having more or fewer components than the computer system depicted in FIG. 11.

Particular Implementations

The technology disclosed, in one implementation, describes a method of making visual data representations actionable, including storing definitions of one or more display fields paired with unique ID fields, wherein the unique ID fields hold unique ID keys to be associated with quantified items represented by visual objects in a data visualization within a data context. The method also includes receiving a query with. in a query data context and creating a set of quantified items responsive to the query; and causing display of the multiple visual objects that represent the quantified items, wherein the quantified items are visually associated with selectable triggers in the data visualization. The method further includes receiving data indicating user selection of a trigger control of a selected quantified item, the data accompanied by at least one unique ID key for the selected quantified item; and launching an action using the unique ID key and an applicable data context.

In some implementations, the applicable data context is the query data context and default usage of the query data context is not overridden by the stored definitions. In other implementations, the applicable data context is an external data context other than the query data context, and further includes in the stored definitions an invocation string that specifies the external data context, wherein the unique ID field is recognized in the external data context, and the invocation string uses the unique ID key to access the external data context.

The disclosed method can include causing display of an action menu with multiple action choices available for the selected quantified item, and receiving data indicating a selected action with the unique ID key. The disclosed technology can also include creating a record of the action using the unique ID key and the selected action; and can include associating a record of the action with preexisting records in a database, using the unique ID key and the selected action. The method can further include creating a record, using the unique ID key, wherein the multiple action choices in the action menu include a log-a-call action, a create-new-case action, a create-new-contact action, a create-new-event action, create-new-lead action, create-new-opportunity action, and create-new-task action.

In some disclosed implementations, the method includes the data visualization being generated by a multi-tenant system for managing digital data for a plurality of tenants, each tenant of the plurality of tenants comprising a group of users who share a common access with a specific set of privileges to a software instance of at least one application, hither including causing display of an action menu that includes an administrator configurable URL link to a subsystem of the multi-tenant system, and receiving data indicating selection of the subsystem with the unique ID key.

In some implementations, the disclosed technology includes implementing the method of making visual data representations actionable across multiple platforms that have different operating systems, in a native desktop application. In other implementations, the method can be implemented in a native mobile device application.

The technology disclosed, in another implementation, describes a method for making visual data table representations actionable, including storing definitions of one or more display fields paired with unique ID fields, wherein the unique ID fields hold unique ID keys to be associated with data rows in a table within a data context. The method also includes receiving a query within a query data context and creating a set of quantified items responsive to the query; and causing display of the multiple data rows in the table, wherein each of the rows is visually associated with a selectable trigger control. The method further includes receiving data indicating user selection of a trigger control associated with a selected data row, the data accompanied by at least one unique ID key for the selected data row; and launching an action using the unique ID key and an applicable data context.

In some disclosed implementations, the method includes causing display of an action menu with multiple action choices available for the selected data row, and receiving data indicating a selected action with the unique ID key. The method can also include creating a record, using the unique ID key, wherein the multiple action choices in the action menu include a log-a-call action, a create-new-case action, a create-new-contact action, a create-new-event action, create-new-lead action, create-new-opportunity action, and create-new-task action. The method can further include the displayed table being generated by a multi-tenant system for managing digital data for a plurality of tenants, each tenant of the plurality of tenants comprising a group of users who share a common access with a specific set of privileges to a software instance of at least one application, further including causing display of an action menu that includes an administrator configurable URL link to a subsystem of the multi-tenant system, and receiving data indicating selection of the subsystem with the unique ID key.

Other implementations may include a computer implemented system to perform any of the methods described above, the system including a processor, memory coupled to the processor, and computer instructions loaded into the memory.

Yet another implementation may include a tangible computer readable storage medium including computer program instructions that cause a computer to implement any of the methods described above. The tangible computer readable storage medium does not include transitory signals.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

What is claimed is:

1. A method for making visual data representations actionable at a user device, comprising:
    storing a definition of at least one display field paired with at least one unique ID field, wherein the at least one unique ID field comprises an ID key associated with a visual object in a data visualization generated by a multi-tenant system for managing digital data;
    receiving a selection of a subsystem of the multi-tenant system, the selection indicating the subsystem with a first unique ID key, wherein receiving the selection of the subsystem of the multi-tenant system comprises receiving a query data context;
    generating a set of quantified items based at least in part on receiving the selection of the subsystem, the set of quantified items being represented by at least one visual object in the data visualization, wherein generating the set of quantified items is based at least in part on receiving the query data context;
    displaying the at least one visual object representative of the set of quantified items, wherein the at least one visual object is visually associated with selectable triggers in the data visualization;
    receiving a selection of a trigger control of a selected quantified item;
    determining a second unique ID key associated with the selected quantified item based at least in part on receiving the selection of the trigger control of the selected quantified item; and
    generating a record using the second unique ID key, wherein the second unique ID key indicates a selection of at least one record in a database for an applicable data context, wherein the applicable data context comprises a string indicating that the generated record is independent of the stored definition.

2. The method of claim 1, further comprising:
    displaying, at the user device, a menu comprising a plurality of action choices, wherein the selection of the trigger control of the selected quantified item is received via the menu.

3. The method of claim 2, wherein the menu comprises a configurable Uniform Resource Locator (URL) to the subsystem of the multi-tenant system, wherein the selection of the trigger control of the selected quantified item indicates the selection of the subsystem.

4. The method of claim 2, wherein the plurality of action choices comprise a log-a-call action, a create-new-case action, a create-new-contact action, a create-new-event action, a create-new-lead action, a create-new-opportunity action, a create-new-task action, or a combination thereof.

5. The method of claim 1, further comprising:
    associating the record with a preexisting record using the second unique ID key and the selection of the trigger control of the quantified item.

6. The method of claim 1, wherein the applicable data context comprises an external data context that includes at least one invocation string.

7. The method of claim 6, wherein the at least one invocation string uses the at least one unique ID field to access the external data context.

8. An apparatus for making visual data representations actionable at a user device, comprising:
    a processor,
    memory in electronic communication with the processor; and
    instructions stored in the memory and executable by the processor to cause the apparatus to:
        store a definition of at least one display field paired with at least one unique ID field, wherein the at least one unique ID field comprises an ID key associated with a visual object in a data visualization generated by a multi-tenant system for managing digital data;
        receive a selection of a subsystem of the multi-tenant system, the selection indicating the subsystem with a first unique ID key, wherein receiving the selection of the subsystem of the multi-tenant system comprises receiving a query data context;
        generate a set of quantified items based at least in part on receiving the selection of the subsystem, the set of quantified items being represented by at least one visual object in the data visualization, wherein generating the set of quantified items is based at least in part on receiving the query data context;
        display the at least one visual object representative of the set of quantified items, wherein the at least one visual object is visually associated with selectable triggers in the data visualization;
        receive a selection of a trigger control of a selected quantified item;
        determine a second unique ID key associated with the selected quantified item based at least in part on receiving the selection of the trigger control of the selected quantified item; and
        generate a record using the second unique ID key, wherein the second unique ID key indicates a selection of at least one record in a database for an applicable data context, wherein the applicable data context comprises a string indicating that the generated record is independent of the stored definition.

9. The apparatus of claim 8, wherein the instructions are further executable by the processor to cause the apparatus to:
    display, at the user device, a menu comprising a plurality of action choices, wherein the selection of the trigger control of the selected quantified item is received via the menu.

10. The apparatus of claim 9, wherein the menu comprises a configurable Uniform Resource Locator (URL) to the subsystem of the multi-tenant system, wherein the selection of the trigger control of the selected quantified item indicates the selection of the subsystem.

11. The apparatus of claim 9, wherein the plurality of action choices comprise a log-a-call action, a create-new-case action, a create-new-contact action, a create-new-event action, a create-new-lead action, a create-new-opportunity action, a create-new-task action, or a combination thereof.

12. The apparatus of claim 8, wherein the instructions are further executable by the processor to cause the apparatus to:

associate the record with a preexisting record using the second unique ID key and the selection of the trigger control of the quantified item.

13. The apparatus of claim 8, wherein the applicable data context comprises an external data context that includes at least one invocation string.

14. The apparatus of claim 13, wherein the at least one invocation string uses the at least one unique ID field to access the external data context.

15. A non-transitory computer-readable medium storing code for making visual data representations actionable at a user device, the code comprising instructions executable by a processor to:

store a definition of at least one display field paired with at least one unique ID field, wherein the at least one unique ID field comprises an ID key associated with a visual object in a data visualization generated by a multi-tenant system for managing digital data;

receive a selection of a subsystem of the multi-tenant system, the selection indicating the subsystem with a first unique ID key, wherein receiving the selection of the subsystem of the multi-tenant system comprises receiving a query data context;

generate a set of quantified items based at least in part on receiving the selection of the subsystem, the set of quantified items being represented by at least one visual object in the data visualization, wherein generating the set of quantified items is based at least in part on receiving the query data context;

display the at least one visual object representative of the set of quantified items, wherein the at least one visual object is visually associated with selectable triggers in the data visualization;

receive a selection of a trigger control of a selected quantified item;

determine a second unique ID key associated with the selected quantified item based at least in part on receiving the selection of the trigger control of the selected quantified item; and generate a record using the second unique ID key, wherein the second unique ID key indicates a selection of at least one record in a database for an applicable data context, wherein the applicable data context comprises a string indicating that the generated record is independent of the stored definition.

16. The non-transitory computer-readable medium of claim 15, wherein the instructions are further executable to:

display, at the user device, a menu comprising a plurality of action choices, wherein the selection of the trigger control of the selected quantified item is received via the menu.

17. The non-transitory computer-readable medium of claim 16, wherein the menu comprises a configurable Uniform Resource Locator (URL) to the subsystem of the multi-tenant system, wherein the selection of the trigger control of the selected quantified item indicates the selection of the subsystem.

18. The non-transitory computer-readable medium of claim 15, wherein the instructions are further executable to:

associate the record with a preexisting record using the second unique ID key and the selection of the trigger control of the quantified item.

* * * * *